United States Patent [19]

Magneron

[11] 4,061,970
[45] Dec. 6, 1977

[54] TRANSMISSION SYSTEM AND REPEATER STATIONS THEREFOR

[75] Inventor: Jean Magneron, Mezieres-les-Metz, France

[73] Assignee: E.L.A.P., Mondelange, France

[21] Appl. No.: 687,739

[22] Filed: May 19, 1976

[51] Int. Cl.² .............................................. H04B 7/14
[52] U.S. Cl. ......................................... 325/2; 325/42; 325/65; 333/18
[58] Field of Search .................... 325/2, 3, 4, 62, 65, 325/42; 333/16, 17, 18

[56] References Cited

U.S. PATENT DOCUMENTS

| 2,054,657 | 9/1936 | Mayer | 333/16 |
| 2,719,270 | 9/1955 | Ketchledge | 333/16 |
| 3,106,679 | 10/1963 | Friedrich | 325/2 |
| 3,456,191 | 7/1969 | Rodenburg | 325/2 |
| 3,993,952 | 11/1976 | Roza | 325/2 |
| 4,003,006 | 1/1977 | Mandeville | 325/62 |

*Primary Examiner*—Robert L. Griffin
*Assistant Examiner*—Michael A. Masinick

*Attorney, Agent, or Firm*—Pollock, Vande Sande & Priddy

[57] ABSTRACT

A transmission system in which wide band electrical signals are transmitted along a transmission line has repeater stations located at intervals along the line for boosting and equalizing the signals. Each repeater station has an equalizer having a frequency response characteristic which generally complements that of the section of the transmission line which it covers. The frequency response characteristic of the equalizer is capable of adjustment to match the section of transmission line which feeds it. The adjustment required will vary when the section of transmission line feeding it has a length differing from that of a norm and where the line is subject to temperature changes. The repeater station incorporates a feedback chain which senses a pilot transmitted along the section of transmission line and responds to the monitored level of the pilot signal to automatically adjust the characteristic of the equalizer until it matches that of the transmission line section in question. This avoids the necessity of manually adjusting the equalizer of the repeater station at each installation.

11 Claims, 7 Drawing Figures

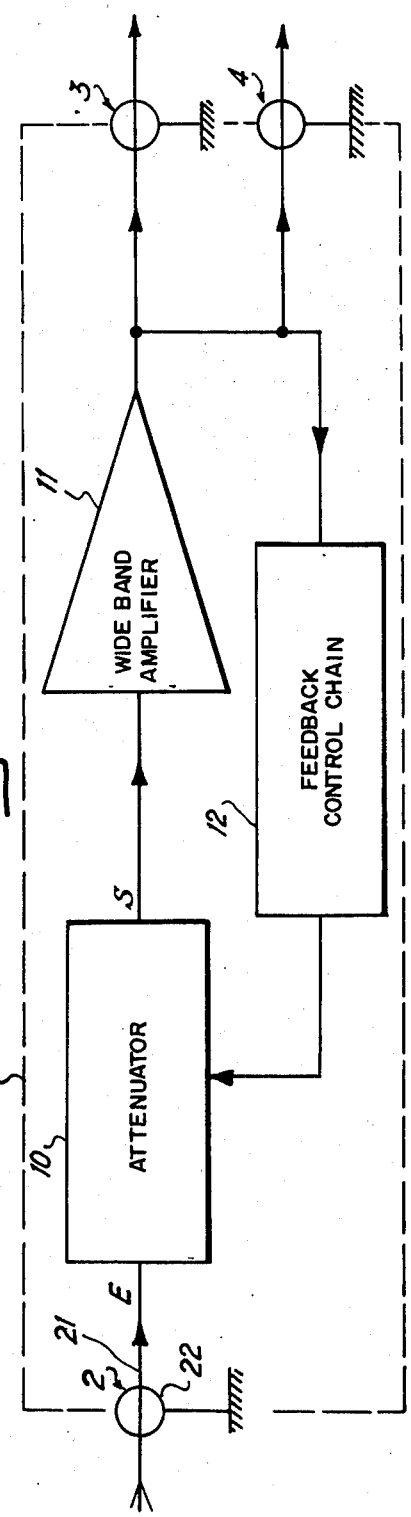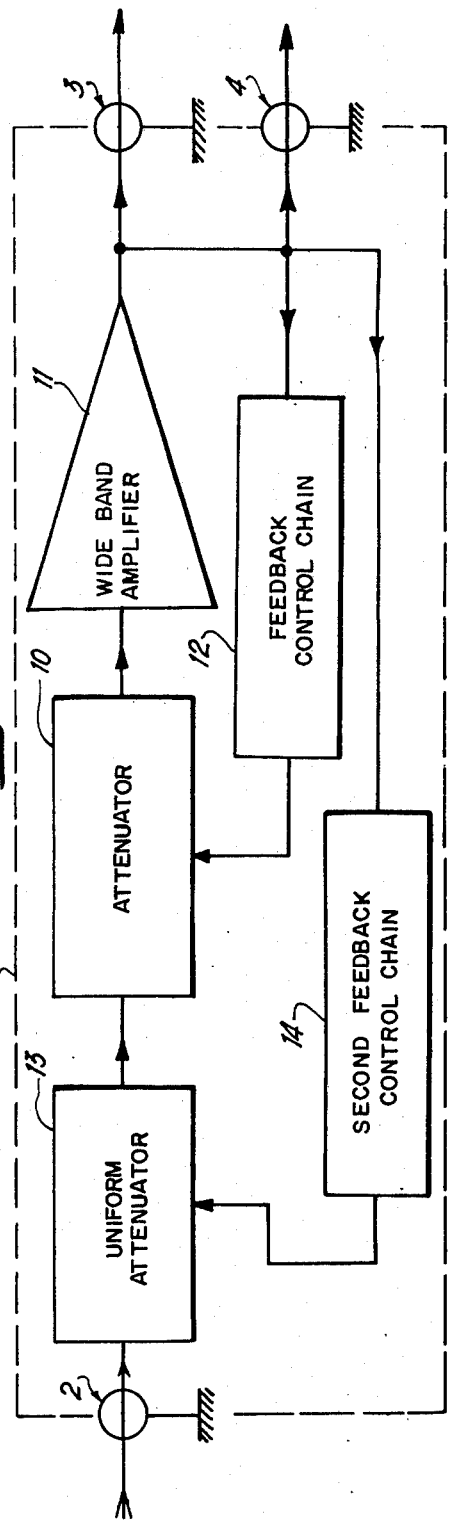

4,061,970

TRANSMISSION SYSTEM AND REPEATER STATIONS THEREFOR

BACKGROUND OF THE INVENTION

1. Field of the invention

The invention relates to transmission systems incorporating signal transmission repeater stations for transmitting and distributing television signals for example.

2. Description of the prior art

The distribution of television signals, or "teledistribution", on co-axial transmission cables is a typical example of wide band transmission. It is known that the transmission of a single channel of television signals requires a frequency band width of several megahertz. In teledistribution by co-axial cable where several television channels are transmitted simultaneously to permit a selection of programmes by the user, the comprehensive bandwidth required for transmission is therefore large, and it is frequently between 30 and 300 MHz.

A co-axial cable has distributed losses which increase with the length of the cable. It is known to compensate for these losses by inserting repeater stations at intervals along the coaxial cable to boost the amplitude of the transmitted signals. Generally, the repeater stations are installed at regular intervals corresponding to a length of cable over which the loss is 21 dB for a 300 MHz signal. Thus, the distance between repeater stations depends upon the type of cable used. As the creation of a junction on the cable also requires an amplification, each repeater station is provided with an auxiliary output.

One difficulty is that the losses for different channels along the co-axial cable are unequal since the losses are a function of the signal frequency, and another is that the losses are variable as a function of the temperature. Moreover, it is difficult to locate the repeaters at strictly regular intervals, corresponding to an attenuation of 21 DB for a 300 MHz signal. As a result the repeater stations are more numerous and located closer to one another than is strictly necessary. A simple repeater station, while preserving the transmission signals and preventing the transmitted signals from being progressively drowned by the noise, does not compensate the inequalities of the losses which are a function of frequency, or their variation with temperature changes.

Repeater stations have incorporated a device called an equaliser or leveller, the task of which is to reduce the difference in losses for different frequencies, and to compensate for the effects of temperature variations. The basic element of such devices is a circuit whose frequency response is made in some way adjustable, and complex regulation means is required for effecting this adjustment.

These systems are not completely satisfactory; either the adjustment possibilities of the frequency response are reduced, which manifests itself in practice by a very imperfect equalisation but which can readily be achieved by automatic means, or these possibilities are very developed which requires complex adjustments requiring the obtaining of detailed data on the real value of the losses to obtain a good equalisation. Advanced intervention of technicians is required in this second instance, and only passes on the technical problems to the design and maintenance stages.

The quality required for equalisation increases with the length of the coaxial cable and of the transmission system. If it is considered that tele-distribution installations cover a substantial geographical area, and aim at technical visits as removed as possible one from the other, it is clear that the solutions set out above are far from meeting this double requirement.

The object of the present invention is to provide an improved transmission system.

The invention also has for its object a simple means intended to automatically equalise and fix the values of the losses in a coaxial transmission cable.

SUMMARY OF THE INVENTION

According to the invention there is provided a repeater station for the transmission of electric signals covering a predetermined frequency band, comprising an equaliser having an adjustable signal level/frequency response slope, an automatic feedback control chain responsive to the output of the equaliser to vary the frequency response slope therefrom in a sense to maintain substantially constant the level of a reference component in the output signal having a predetermined frequency.

According to the invention there is further provided a repeater station for equalising electrical signals having a predetermined band width and passing along a transmission line the station comprising an equaliser having a signal level/frequency characteristic which generally complements that of the transmission line, feedback means for monitoring the output of the equaliser and responsive to a reference signal therein which is processed through the equaliser and has a frequency equal to the upper frequency in the predetermined band width, the feedback means being operative to control the slope of the equaliser characteristic in a sense to maintain the monitored level of the reference signal at a predetermined level whereby to compensate the characteristic of the equaliser for variations in the characteristic of the transmission line due to changes in temperature and line length over a limited range.

BRIEF DESCRIPTION OF THE DRAWINGS

Television signal repeater stations embodying the invention will now be described by way of example, with reference to the accompanying diagrammatic drawings in which:

FIG. 1 is a block diagram of one of the repeater stations;

FIG. 4 is a block diagram of another one of the repeater stations;

DESCRIPTION OF THE PREFERRED EMBODIMENTS

Figure 2:
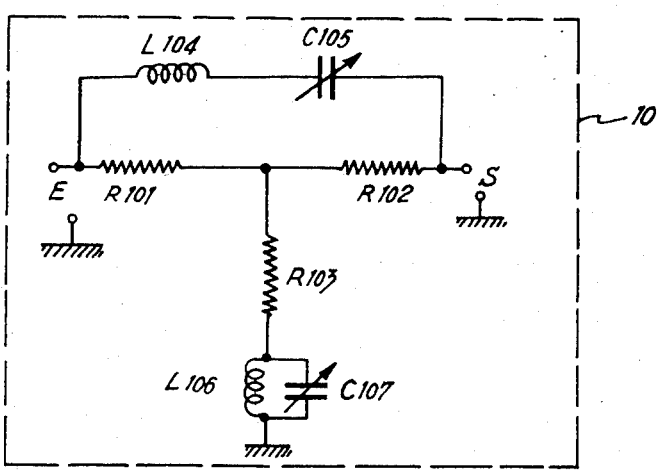
FIG. 2 is a circuit diagram of the attenuator of the repeater station of FIG. 1.

As shown in FIG. 1 the repeater station 1 has an attenuator 10 controllable to vary the attenuation of received signals, and HF (high frequency) wide band amplifier 11, and an automatic feedback control chain 12.

The attenuator 10, which is in the form of an equaliser, has its input connected to an input terminal 2 of the repeater station 1, and more precisely to the centre pin 21 of this input terminal 2, which is arranged to be connected to the central or inner conductor of a coaxial cable. The armouring or annular outer conductor 22 of the input terminal is connected to the chassis of the repeater station. The output of the attenuator is connected to the input of the wide band HF amplifier 11. The HF amplifier 11 is constructed in known manner, and is connected to supply two coaxial output terminals 3 and 4, the output terminal 3 being for sending the output signal along another section of coaxial cable to the next repeater station, and the output terminal 4 being for sending the output signal along a coaxial cable directly to a local user.

The automatic feedback control chain 12 has its input connected to an output of the wide band HF amplifier 11 and has its output feeding a control input of the attenuator 10.

The attenuator as shown in more detail in FIG. 2 has an input E, an output S, and a resistive T-pad having two resonant circuits. The resistive T-pad includes three resistors R101 to R103. Resistors R101 and R102 are connected in series between the input E and the output S. Thus, they form two branches of the resistive T-pad. The third resistor R103 has one end connected to the junction between the resistors R101 and R102 and thus forms the stem or third branch of the resistive T-pad.

A first resonant circuit, in the form of the series combination of an inductance L104 and a variable capacitor C105 (advantageously a varicap diode), is connected in parallel with the series connected resistors R101 and R102.

A second resonant circuit, in the form of the parallel combination of an inductance L106 and a variable capacitor C107, (advantageously a varicap diode) is connected in series between the free end of the resistor 103 and the chassis of the repeater station.

Figure 3A:
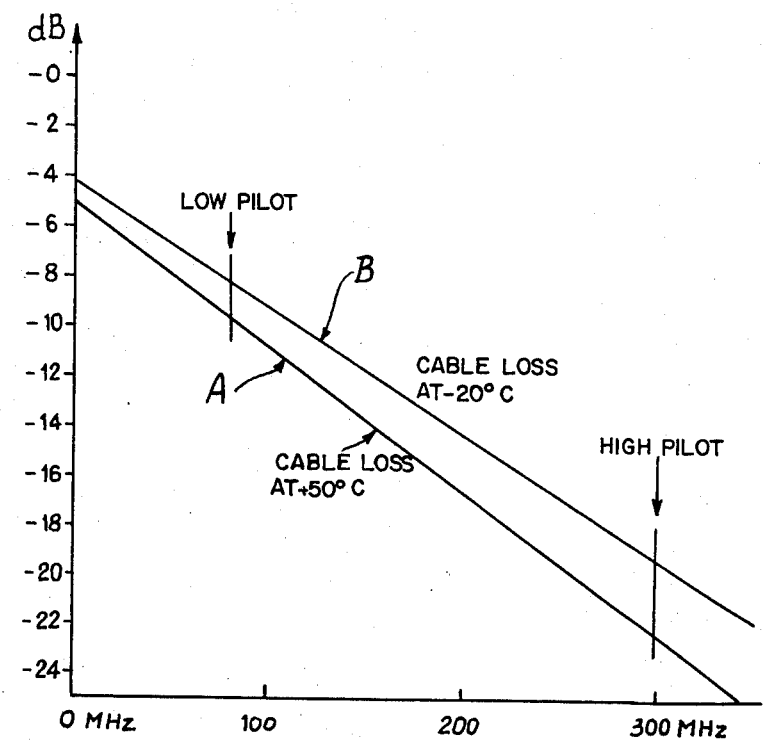
FIGS. 3A and 3B are respectively a graph of cable losses as a function of frequency for different temperatures and a graph of the attenuator/frequency characteristic of the repeater station.
Figure 3B:
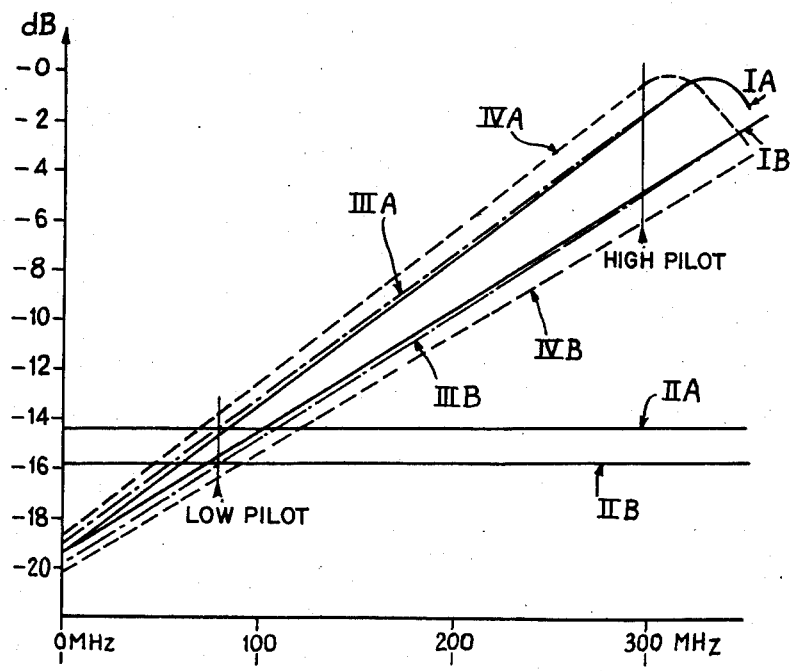

The frequency response of the attenuator 10 when the adjustment of the variable capacitors C105 and C107 was such that the tuning frequencies of the two resonant circuits were substantially the same is represented by the curves IA and IB of FIG. 3B, over a frequency range of from 0 to 300 MHz. The frequency response cruve is plotted in terms of amplification gain, thus the lower the value of any point on the curve, the greater the attenuation. In FIGS. 3A and 3B the frequency is plotted along the abscissae while the gain is plotted along the ordinate axis in a logarithmic attenuation scale. The frequency/attenuation curve for a length of a coaxial cable is thus a straight line as shown in FIG. 3A as is also that of the characteristic curve of the attenuator 10, the two curves being generally complementary.

When the common tuning frequency of the two resonant circuits is adjusted so as to be in the vicinity of 300 MHz, the frequency response is that of curve IA of FIG. 3B. For signals having the resonant frequency, the attenuator passes these substantially without attenuation. Indeed, the resonant circuit of L104 and C105 offers a minimum impedance which in effect short-circuits the series connected resistors R101 and R102. At the same time, the parallel resonant circuit L106 and C107 is an anti-resonant circuit (or rejector, tank, trap circuit) offering a maximum impedance; and it prevents the passage of the resonant frequency currents towards the chassis, which is the attenuation generating factor. The possibility of resonance frequency signals is further reduced if the input impedance of the amplifier 11 is high.

In the curve IA shown in FIG. 3B it will be seen that the curve reaches a maximum when its level is substantially equal to OdB at a resonant frequency close to 300 MHz.

For direct current (therefore of nil frequency) the resonant circuits are inoperative and the attenuation is simply defined by the resistors R101, R102 and R103 (as well as the resistance of inductance L106 if it is significant); the attenuation is therefore −19.5 dB at nil frequency.

Thus the frequency response is illustrated by a straight line between frequency nil and 300 MHz for curve IA. The slope of this straight line is dependent upon the value of resistances R101, R102 and R103 and if significant upon the value of the resistance of the inductance L106. Beyond the resonance frequency, curve IA again proceeds downwards.

Curve IB represents the response of the same attenuator corrector 10 when the two resonant circuits are tuned to a resonant frequency significantly greater than 300 MHz, for example 400 MHz. This tuning frequency is now decidedly beyond the wide transmission band of the transmission system. Under these conditions, the maximum point of the response curve IB, which corresponds to an attenuation of 0 xB, lies outside the graph, and there is already a substantial attenuation, of −5,5 dB, at the 300 MHz frequency. However, at nil frequency, the attenuation remains unchanged. As curves IA and IB of FIG. 3B indicate, by tuning the two resonant circuits of the attenuatorcorrector 10 shown in FIG. 2, and by adjusting this common tuning frequency, it is possible to alter the slope of the response curve of the attenuator-corrector within a predetermined frequency band, which extends here from 30 to 300 MHz.

The attenuator 10 therefore has, in the transmission frequency band, an attenuation which decreases as a function of the frequency, down to a minimum attenuation (0 dB). The control afforded by the automatic feedback control chain acts to shift the resonant frequency of the two resonant circuits and thereby modifies the slope of the frequency response produced by the attenuator over the transmission frequency band. The control of the slope of the response curve is determined by a first pilot signal transmitted with the television signals at the point of origin of the transmitted signals in the transmission system. The frequency of the pilot signal is equal to the highest frequency in the band width of the transmission band and its level at the point of origin is maintained substantially constant.

The automatic feedback control chain is therefore responsive to detect the pilot signal appearing at the output of the repeater station and acts on the attenuator-corrector in such a sense as to render the level of the detected signal equal to a reference level.

FIG. 3A illustrates two extreme limit-cases of losses in a cable as a function of frequency. Curve A corresponds to a maximum length of cable at a temperature of +50° C. Curve B corresponds to a minimal length of cable and at a temperature of −20° C. Naturally, the maximum and minimum lengths are associated with the same quality of the cable. It has been found that the automatic common variation of the tuning frequencies of the two resonant circuits supplies in practice a good equalization in these two extreme cases and also under all intermediate conditions. For the limit case of curve B of FIG. 3A, the automatic control feedback chain will regulate the attenuator-corrector according to curve IB of FIG. 3B. For the other limit-case A of FIG. 3A, the automatic control feedback chain will regulate the attenuator-corrector according to curve IA.

It will be seen that at the level of the high pilot signal, the gap between curves A and B of FIG. 3A corresponds to the gap between curves IA and IB of FIGS. 3B. However, this does not hold for the low frequencies.

The automatic common variation of the tuning frequencies of the two resonant circuits works in practice for a single repeater station. However equalization becomes insufficient over the lower frequency band, when there are several repeater stations in the system. In the two curves of line IA and IB of FIG. 3B, the variation is nil at frequency 0, whereas the resistance variation of the cable is not nil for direct current.

To perfect the correction at the lower end of the transmission band, a modified repeater station 5 as shown in FIG. 4 is provided. In FIG. 4 parts similar to those in FIG. 1 are similarly referenced. As shown in FIG. 4, the station 5 includes a controllable attenuator 13 between the input terminal 2 of the repeater station 5 and the attenuator 10. A second automatic control feedback chain 14 extends between the output of the wide band HF amplifier and a control input terminal of the attenuator 13. In addition to transmitting a first pilot signal having a frequency equal to the highest frequency in the transmission band width, the transmission system also transmits a second pilot signal having a frequency substantially equal to the lowest frequency in the transmission bandwidth. The amplitude of this second pilot signal is maintained at a substantially constant level at its point of origin in the system. The second automatic control feedback chain is operable to detect this second pilot signal at the output of the repeater station and is operable to control the attenuator 13 in a sense such that the detected second pilot signal becomes equal to a second reference level.

Reverting now to FIG. 3 B, curves IIA and IIB represent respectively two possible attenuation levels effected by the uniform attenuator 13 (FIG. 4) when connected electrically in series with the attenuator 10. The attenuation effects of the two attenuators 10 and 13 are thus added together.

In FIG. 3B, the attenuation is measured on a logarithmic scale. As will be appreciated, the logarithmic measure of the product of two attenuations is equal to the sum of the individual logarithmic measurements of these two attenuations. Thus, curve IIIA defines the result of the action of the attenuator 10 (curve IA) and that of the uniform attenuator 13, performed in such a manner that at the frequency of the second pilot signal, the curve IIIA cuts curve IIA. This intersection corresponds to the control effected by the second automatic feedback control chain, to compensate for the losses of the type defined by curve A of FIG. 3A. Note will be taken of the remarkable correspondence between the loss curve A of FIG. 3A and the resultant correction curve IIIA of FIG. 3B, from 0 to 300 MHz.

Similarly, the action of the attenuator 10 according to curve IB is combined with that of the uniform attenuator 13 to give curve IIIB, which intersects the curve IIB at the level of the frequency of the second pilot signal. It is also noted that over the frequency range of 0-300 MHz, the correction curve IIIB closely matches to the loss curve B of FIG. 3A.

Finally the curves IVA and IVB of FIG. 3B illustrate the limits of the corrections possibilities by the two attenuators; as will be seen further on, these limits define the tolerance admissible in a length of cable between adjacent repeater stations.

Figure 5:
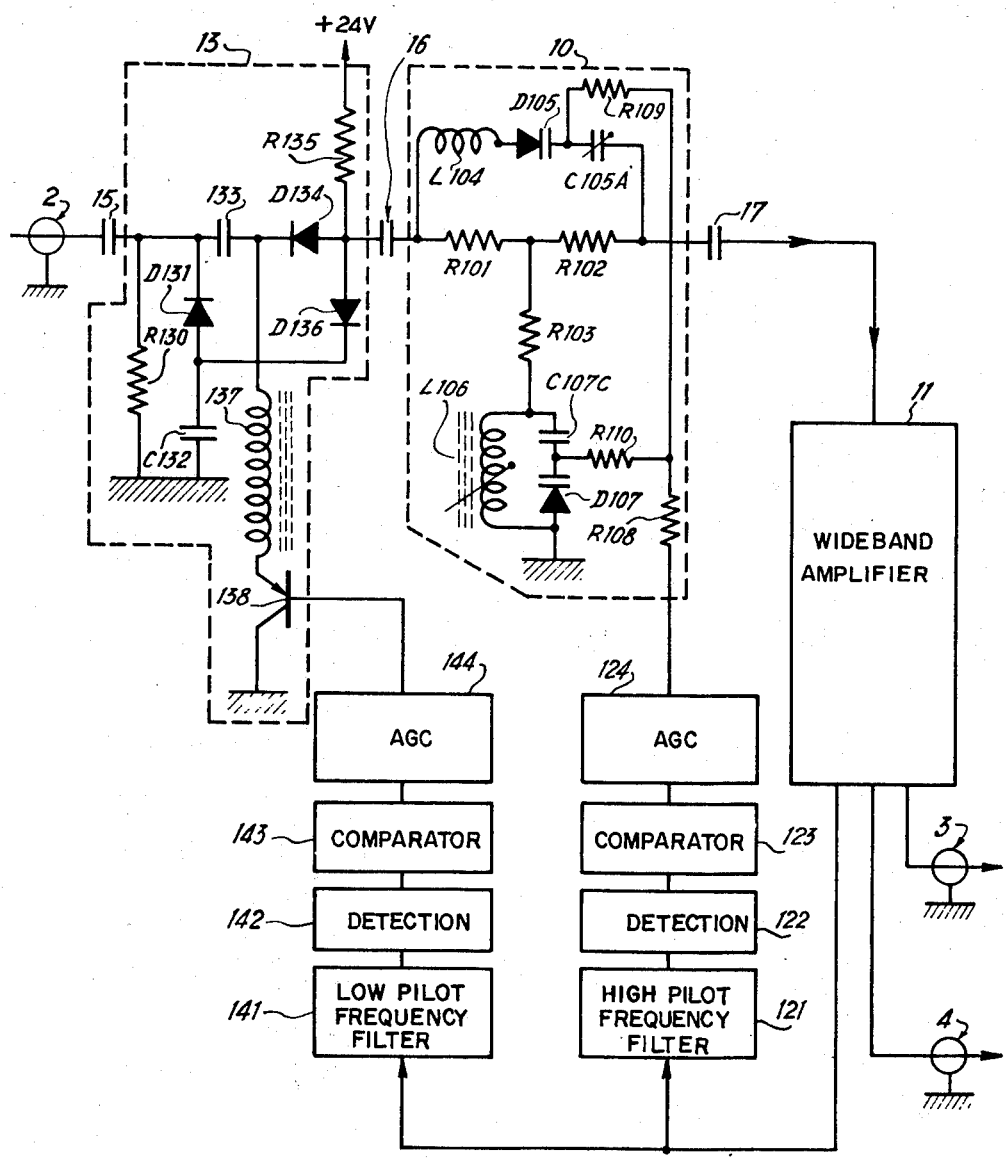
FIG. 5 is a circuit diagram of the repeater station of FIG. 4.

FIG. 5 shows the attenuators 10 and 13 and the two feedback chains 12 and 14 of the repeater station of FIG. 4 in more detail.

As shown in FIG. 5, the attenuator 13 is connected to the input terminal 2 by an A.C. coupling capacitor 15 which transmits alternating currents but blocking the direct currents. The output of the attenuator 13 is connected to the input of the attenuator 10 by another A.C. coupling capacitor 16. A third A.C. coupling capacitor 17 interconnects the output of the attenuator 10 with the input of the wide band HF amplifier 11. The amplifier 11 has three separate outputs. One of these outputs is connected to the output terminal 3 supplying the next stage or link in the transmission system downstream and another of these outputs is connected to a terminal 4 for supplying a local user. The third output supplies the two automatic feedback control chains which will now be described in more detail.

The first automatic feedback control chain 12 comprises a filter 121 tuned to pass the high frequency pilot signal, a detector 122 (for example a diode) a comparator 123, and a direct current and low frequency amplifier 124. This amplifier is of the type commonly used in the automatic gain control (AGC) circuits of radio and television receivers, for example.

The second automatic feedback control chain 14 has a filter 141 tuned to pass the low frequency pilot signal, a detector 142, a comparator 143, and an AGC (automatic gain control) amplifier.

The reference values of the comparators 123 and 143 are set to correspond with the desired amplitude levels for the pilot signals at the output of the repeater station. The detection circuits 122 and 142 supply the levels of the two pilot signals to the respective comparators 123 and 143 after filtration, and these two levels are compared with their respective reference levels.

As soon as one of the comparators detects a difference, the associated amplifier 124 or 144 acts in a sense to reduce the difference to zero.

The attenuator-corrector 10 includes the resistors R101, R102 and R103 of FIG. 2, as well as the inductor L104 and the inductor L106 which is here an adjustable inductance. In the series resonant circuit, the variable capacitor C105 is constituted by a varicap diode D105, in series with an adjustable capacitor C105A. In the parallel resonant circuit, the variable capacitor C107 is constituted by a varicap diode D107 as well as a complementary capacitor C107C.

The adjustable inductor L106 and the adjustable capacitor C105C respectively enable an initial adjustment of the tuning zones of the parallel and series resonant circuits.

The capacitor C107C also acts as a d.c. separator for the varicap diodes D105 and D107 which are to be varied to enable the variation of the tuning frequencies.

The amplifier output 124 is fed through a common resistor R108 to a first resistor R109 which is connected to the VARICAP diode D105 and to a second resistor R110 which is connected to the VARICAP diode D107.

The current which controls the VARICAP diode D105 thus passes through the common resistor R108, the resistor R109, the varicap diode D105 itself, the inductance L104, the resistor R101, the resistor R103, and finally through the inductance L106 to the chassis.

The other varicap diode D107 has a much simpler control circuit, which passes through the common resistor R108, the resistor R110 and the diode D107 itself before passing to the chassis.

The tuning parameters of the two resonant circuits, as well as the values of the resistors which form part of the control networks of the two varicap diodes, are selected in such a manner as to permit the running of the two resonant circuits at a common frequency which is variable as a function of the output voltage of the amplifier 124.

The attenuator 13 is in the form of a uniform PIN diode attenuator but any other form of controllable attenuator can be used (mechanical attenuator with servocontrol, for example).

The attenuator 13 has a resistor 130 connected between the A.C. coupling capacitor 15 and the chassis. The series combination of a first PIN diode D131 and a capacitor C132 is connected in parallel with the resistor 130.

The output of the capacitor 15 also feeds another A.C. coupling capacitor 133 which in turn supplies a second PIN diode D134 connected in series with the coupling capacitor 16. The junction between the diode 134 (here the anode of this diode) and capacitor 16 is connected to a voltage source of +24 volts through a resistor R135, and also to the anode of a third diode PIN D136. The cathode of the PIN diode D136 is connected to the junction between the capacitor C132 and the PIN diode D131 (here the anode of this diode). Thus a direct current path is provided through the resistor R135, the PIN diode D136, the PIN diode D131, and the resistor R130, to the chassis or ground.

The junction between the capacitor 133 and the diode D134 (the cathode of this diode) is connected through a choke coil 137 (for blocking the high frequency currents) to the emitter of a PNP transistor 138 whose collector is connected to ground and whose base is connected to the output of the amplifier 144.

A second direct current path passes therefore through the resistor 135, the diode 134, the choke coil 137, and the emitter-collector path of the transistor 136. The current flowing along this path is dependent upon the output voltage supplied to the base of the transistor 138 by the amplifier 144. Therefore, this current which is controlled by the transistor 138, when it increases, causes a reduction in the high frequency resistance of D134 and so produces a voltage drop at the junction of the components D134, R135 and D136. This in turn decreases the current through the components D136, D131 and R130 and so increases the high frequency resistance of the diodes D131 and D136 to reduce the attenuator losses. Conversely, the resistance of the diode D134 tends towards infinity whereas that of the diodes D131 and D136 tends towards a minimum at a value of 75 ohms corresponding to the characteristic impedance of the attenuator. This impedance is maintained substantially at this value throughout the useful variation area of the attenuator.

It has been found that the standing wave ratio at the input of the assembly attenuator plus equalizer does not exceed 1.3 throughout the variation area of the assembly.

The PIN diode attenuator thus supplies a substantially constant attenuation for a signal of any frequency. It could in principle be controlled by a pilot signal of any frequency in the band width other than the lowest frequency or even, if need be, the frequency of the pilot signal could lie outside the bandwidth subject to the amplifier 11 still being effective for that frequency. The same pilot signal could in fact be supplied to both control chains; if its frequency were equal to the highest frequency in the bandwidth apart from this case, it is of course necessary that the frequency of the low frequency pilot signal should not go through the filter of the high frequency pilot signal, and vice-versa.

However, it is very advantageous that the second pilot wave should have a frequency situated in the bottom of the transmission band. Indeed, this permits operating the wide band 11 amplifier under optimum conditions and such an operation is important for wide band amplifiers which are generally delicate devices.

Moreover, to prevent an instability of the amplification of the repeater which would be due to the reaction between the two automatic control chains, the response time of the amplifier 144 of the second control chain should be selected to be much longer than that of the amplifier 124 of the first control chain. Preferably, it is selected to be ten times longer.

It will thus be appreciated that the described repeater stations can have the following characteristics:- a. at the low pilot point, the variation at the output is less than 0.1 dB for a 10 dB variation at the input;

b. at the high pilot signal point, the variation at the output is 0.1 dB for a variation of 5 dB at the input.

Within the limit of variation of losses of 5.5 dB at 300 MHz (case of FIG. 3A), the fluctuation of the flatness of the response curve after compensation remains limited to + 0.1 dB throughout the frequency range of from 30 to 300 MHz.

Naturally, the stations described can be arranged to operate at any other frequency band extending beyond 300 MHz.

The described repeater station thus automatically corrects for non linear distortions of the received signals produced by their travel along a coaxial line by adjustments in the course of manufacture without requiring on-the-spot adjustment of the installed station, this being irrespective of temperature variations and, within certain limits, the length of the cable.

EXAMPLE

A transmission system incorporates repeater stations having a nominal amplification of 21 dB. The cable used between stations is such that it provides an attenuation of 3.5 dB over 100 metres for a signal having a frequency of 300 MHz. For an attenuation of 21 dB, this cable will have a length of 600 metres between repeaters. The losses of this same cable vary with the temperature by 0.002 dB per dB and per degree Celsius. If the installation is an overhead one, the limits of temperature variation of the cable may well be between −20° and +50°, i.e. a variation of 70°. The total losses variation of the cable at 300 MHz will therefore be:

$$0.002 \times 21 \times 70 = 2.94 \text{ dB}$$

The repeater station can compensate for variations of up to 5.5 dB at 300 MHz, and therefore it permits in addition the compensation of a cable length tolerance representing:

5.5 − 2.94 = 2.56 dB i.e. 73 or again approximately ± 36 metres over a 600 metre stretch.

In the case of an underground installation (utilising the Post Office tubing for example), the temperature variation is estimated to be limited to twenty or so degrees Celsius. The loss variation of the cable of 21dB is therefore:

0.002 × 21 × 20 = 0.84 dB at 300 MHz.

Considering the repeater station providing the same 5.5 dB variation for compensation, it may be sufficient to have a regulator-repeater every three sections of cable with the same tolerance in length distributed over the three sections.

Each repeater station can include a logic unit which supplies a positive voltage warning signal and which can be used for a tele-display of a breakdown as soon as either, or both, of the pilot signals does not arrive correctly. At the same time the logic unit would switch the repeater station over to manual control instead of automatic control. Thus, in spite of a pilot signal failure, the output level of the amplifier will remain at the level set manually at the works before the AGC is put into operation. This same level can then be adjusted in response to the output from a thermal probe incorporated into the repeater station and acting on the attenuators.

Figure 6:
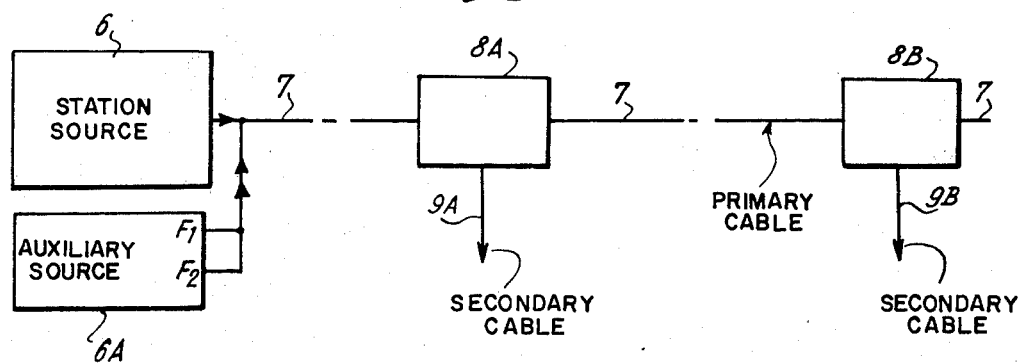
FIG. 6 is a block diagram of a television signal transmission system incorporating repeater stations.

FIG. 6 is a block diagram of a transmission system incorporating repeater stations as described in conjunction with FIG. 4.

As shown in FIG. 6, the system includes station-source 6 for transmitting along a cable 7 electric signals representing, for example, several television channels. Repeaters 8A, 8B, etc., are disposed in series along the length of the coaxial cable 7, and each of these repeaters 8A and 8B has a respective branch 9A and 9B supplying a secondary line. An auxiliary source 6A supplies the coaxial cable 7 with pilot signals having frequencies of F1 and F2 and constant level. The auxiliary source 6A is shown alongside the station-source 6, but instead it can be incorporated with it.

It is possible to use repeater stations such as that shown in FIG. 1 instead of some of the repeater stations of FIGS. 4 and 5. Moreover, it is not necessary for all the repeaters of the system to be repeater stations embodying the invention.

However, it is preferable to use the repeater stations according to the diagrams of FIGS. 4 and 5, in such a way that the distance between two of them does not exceed a maximum. This maximum naturally depends on the type of the coaxial cable as well as on climatic characteristics of the environment in which the system is located.

I claim:

1. A repeater station for cable transmission of high frequency signals covering a predetermined wide band of frequencies and including a reference component having a predetermined frequency, said station comprising:
   an equalizer including a resistor T pad having two transverse resistive members and one leg member,
   a series resonant circuit connected in parallel across both transverse resistive members of said T, and a parallel resonant circuit connected in series with said leg member of said T,
   ends of said transverse resistive members defining input and output of said equalizer, while an end of said leg member is coupled to ground,
   said two resonant circuits having an adjustment means for adjusting the resonant frequency of each, and
   automatic control means having an input coupled to said equalizer output and output coupled to said adjusting means, said automatic control means responsive to a level of said reference cmmponent of said equalizer output to adjust the resonant frequencies of said two resonant circuits thereof and a corresponding substantially common frequency in a sense to maintain substantially constant said level of said reference component, whereby a signal level/frequency response slope of said equalizer is varied to correct for increasing losses in said transmitting cable of higher frequencies in said predetermined wide band frequencies.

2. A repeater station according to claim 1, including an amplifier having an input and an output and having a bandwidth corresponding to the predetermined frequency band, the input being connected to the output of the equaliser and the output being connected to the input of the automatic control means.

3. A signal transmission system, comprising
   a station source for producing electric signals over a predetermined band width and a pilot signal having a constant level of predetermined frequency, and
   a transmission cable connected to said station-source, the transmission cable being interrupted at intervals by repeater stations for boosting the electrical signals passing therealong, each repeater station having apparatus recited in claim 1 and responding to the pilot signal as said reference component.

4. A repeater station according to claim 1, wherein the automatic control means comprises
   a narrow band width frequency filter connected to said equalizer output for passing the said reference component
   a level detector connected to the filter to provide an output indicative of the level of the reference component,
   a comparator having a reference value representing a desired level for the reference component and connected to receive the output of the level detector, the comparator providing a control signal which is a function of the difference between the level of the reference component and the reference value, and
   further means for feeding the control signal to the adjustment means to control the signal level/frequency response slope of the equalizer in response thereto.

5. A repeater station according to claim 4, wherein the adjustment means of each resonant circuit comprises a variable capacity diode, and in which the control means is connected to each diode to supply each diode with a variable bias voltage for modifying the capacitance and thereby the tuning frequency of its corresponding resonant circuit.

6. A repeater station according to claim 1, including
   an attenuator having an input, an output and a control input for varying the attenuation of signals passing from the input to the output in controlled manner independently of the frequency of the signals, the output of the attenuator being connected to the input of the equaliser, and
   a second control means having an input connected to the output of the equaliser and an output connected to the control input of the attenuator, the second chain being responsive to a reference signal of predetermined reference frequency processed through the equaliser to control the attenuator in a sense to maintain the detected reference signal at a predetermined level.

7. A repeater station according to claim 6, wherein the frequency of the reference signal lies at the lower end of the predetermined frequency band width.

8. A repeater station according to claim 6, wherein the attenuator includes a PIN diode which is supplied with direct current by the output of the second automatic feedback control chain.

9. A signal transmission system, comprising
a station source for producing electric signals over a predetermined band width together with a first pilot signal having a constant level at a first predetermined frequency and a second pilot signal having a constant level at a second predetermined frequency, and
a transmission cable connected to said station source, the transmission cable being interrupted at intervals by repeater stations for boosting the electrical signals passing therealong, each repeater station having apparatus recited in claim 6 and responding to the first pilot signal as said reference component and the second pilot signal as said reference signal.

10. In a transmission system including a transmission line having a predetermined signal level/frequency characteristic for electrical signals having a predetermined bandwidth, a repeater station for equalizing the said electrical signals, the station comprising:
an equalizer having a signal level/frequency characteristic which generally complements that of the transmission line and a control input for adjusting the said characteristic of said equalizer,
feedback means for monitoring the output of said equalizer and responsive to a reference signal therein which is processed through said equalizer and has a frequency equal to an upper frequency in said predetermined bandwidth,
said feedback means having an output connected to said control input of said equalizer and being operative to control the slope of the equalizer characteristic in a sense to maintain the monitored level of the reference signal at a predetermined level in order to compensate the characteristic of the equalizer for variations in the characteristic of said transmission line due to changes in temperature and line length over a limited range,
said equalizer including a resistive T pad having two transverse resistive members and one leg member, a series resonant circuit connected in parallel acrosss both transverse resistive members of said T, and a parallel resonant circuit connected in series within said leg member of said T,
ends of said transverse resistive members forming input and output of said equalizer and an end of said leg member coupled to ground,
said two resonant circuits including adjustment means for adjusting the resonant frequency of each and coupled to said control input of said equalizer.

11. A repeater station according to claim 10, including
an amplifier having a band width equal to the predetermined band width connected to amplify the output of the equaliser to boost the level of the equalised signals,
a variable attenuator connected to attenuate the signals received by the equaliser uniformly and independently of frequency and having a control input for adjusting the attenuation provided by the attenuator, and
second feedback means connected to detecting the said reference signal or another reference signal passed through the amplifier and to feed the control input of the attenuator to adjust the attenuator in a sense to maintain the detected reference signal at a second predetermined level.

* * * * *